United States Patent
Leydon

(10) Patent No.: US 9,250,722 B2
(45) Date of Patent: Feb. 2, 2016

(54) PRESSURE AND ANGLE-SENSITIVE STYLUS DEVICE

(71) Applicant: Disney Enterprises, Inc., Burbank, CA (US)

(72) Inventor: Krispin Leydon, La Canada Flintridge, CA (US)

(73) Assignee: Disney Enterprises, Inc., Burbank, CA (US)

( * ) Notice: Subject to any disclaimer, the term of this patent is extended or adjusted under 35 U.S.C. 154(b) by 143 days.

(21) Appl. No.: 13/735,965

(22) Filed: Jan. 7, 2013

(65) Prior Publication Data

US 2014/0192028 A1    Jul. 10, 2014

(51) Int. Cl.
*G06F 3/0354* (2013.01)

(52) U.S. Cl.
CPC .................................. *G06F 3/03545* (2013.01)

(58) Field of Classification Search
None
See application file for complete search history.

(56) References Cited

U.S. PATENT DOCUMENTS

| | | | | |
|---|---|---|---|---|
| 7,791,598 | B2 * | 9/2010 | Bathiche | 345/179 |
| 8,648,837 | B1 * | 2/2014 | Tran et al. | 345/179 |
| 2004/0135776 | A1 * | 7/2004 | Brouhon | 345/179 |
| 2009/0025243 | A1 * | 1/2009 | Prestidge et al. | 33/559 |
| 2012/0228039 | A1 * | 9/2012 | Hinson et al. | 178/19.03 |
| 2013/0106772 | A1 * | 5/2013 | Kim | 345/174 |
| 2013/0106794 | A1 * | 5/2013 | Logan | G06F 3/044 345/179 |
| 2014/0019070 | A1 * | 1/2014 | Dietz et al. | 702/41 |

* cited by examiner

*Primary Examiner* — Dorothy Harris
*Assistant Examiner* — Bipin Gyawali
(74) *Attorney, Agent, or Firm* — Farjami & Farjami LLP

(57) ABSTRACT

There is provided a system and method for a pressure and angle sensitive stylus device. The method comprises detecting a plurality of pressure inputs using a plurality of sensors, determining an angle of pressure applied to a stylus device from the plurality of pressure inputs, and transmitting the angle of pressure to an interactive device. The plurality of sensors may be recalibrated when the plurality of sensors are not in use. Further, using the plurality of pressure inputs may detect a velocity of usage of the stylus device. The plurality of sensors may include three sensors arranged in a radially symmetric pattern about a longitudinal axis of the stylus device.

14 Claims, 3 Drawing Sheets

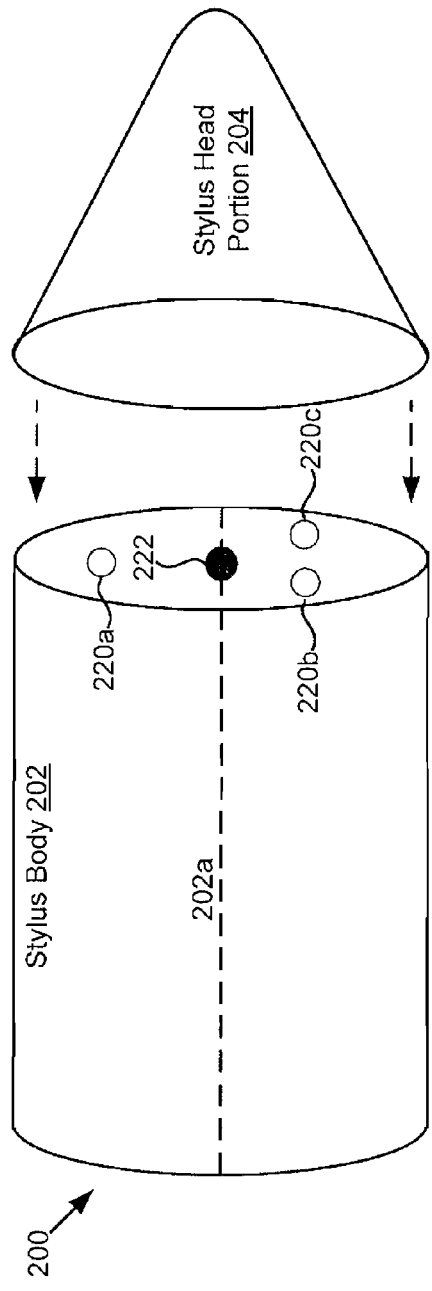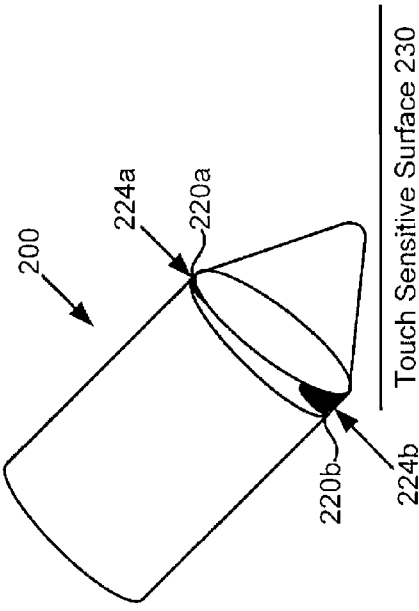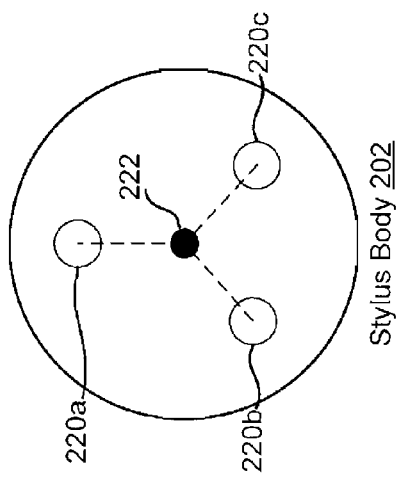

PRESSURE AND ANGLE-SENSITIVE STYLUS DEVICE

BACKGROUND

Active styli have become popular tools for use with interactive devices having touch sensitive screens. Artistic and writing applications on interactive devices offer a quick and mobile artistic canvas, however, touch inputs using a finger don't offer the level of detail that users can achieve using common pens, pencils, and paintbrushes. A stylus provides the user with a pen-type configuration that allows the user to write or draw in a conventional manner. Thus, users have found the increased accuracy and comfort of use associated with a stylus device better for making more detailed artistic creations. Furthermore, styli can mimic shapes of other artistic tools, such as a paintbrush, marker, stamp, or other desired configurations.

Active styli have gone further to provide features for the user to utilize with an application running on an interactive device. Some of these features allow for a user to come closer to mimicking traditional artistic tools. However, in real world artistic endeavors, pressure and angle of use of the pen, pencil, paintbrush, or other creative tool often have an effect on an overall artistic look. If the artist uses a side of a piece of graphite or pencil, it may have a noticeably different effect on the outlook of the drawing then using a pointed tip. Furthermore, the pressure and speed of use of the tool may also affect the overall artistic look of the project. However, touch sensitive screens are only capable of sensing touch events and not the pressure or angle of use of the stylus. Thus, contrary to the intent of the user, a touch sensitive screen may fail to capture drawn accents that would be possible on an analogous physical medium.

SUMMARY

The present disclosure is directed to a pressure and angle sensitive stylus device, substantially as shown in and/or described in connection with at least one of the figures, as set forth more completely in the claims.

BRIEF DESCRIPTION OF THE DRAWINGS

FIG. 2A shows a more detailed pressure and angle sensitive stylus device with three sensors;

FIG. 2B shows a cross section of a body of a pressure and angle sensitive stylus device with three sensors arranged in a radially symmetric pattern about a longitudinal axis of the stylus device;

FIG. 2C presents a pressure and angle sensitive stylus device in use with a touch sensitive surface;

DETAILED DESCRIPTION

Figure 1:
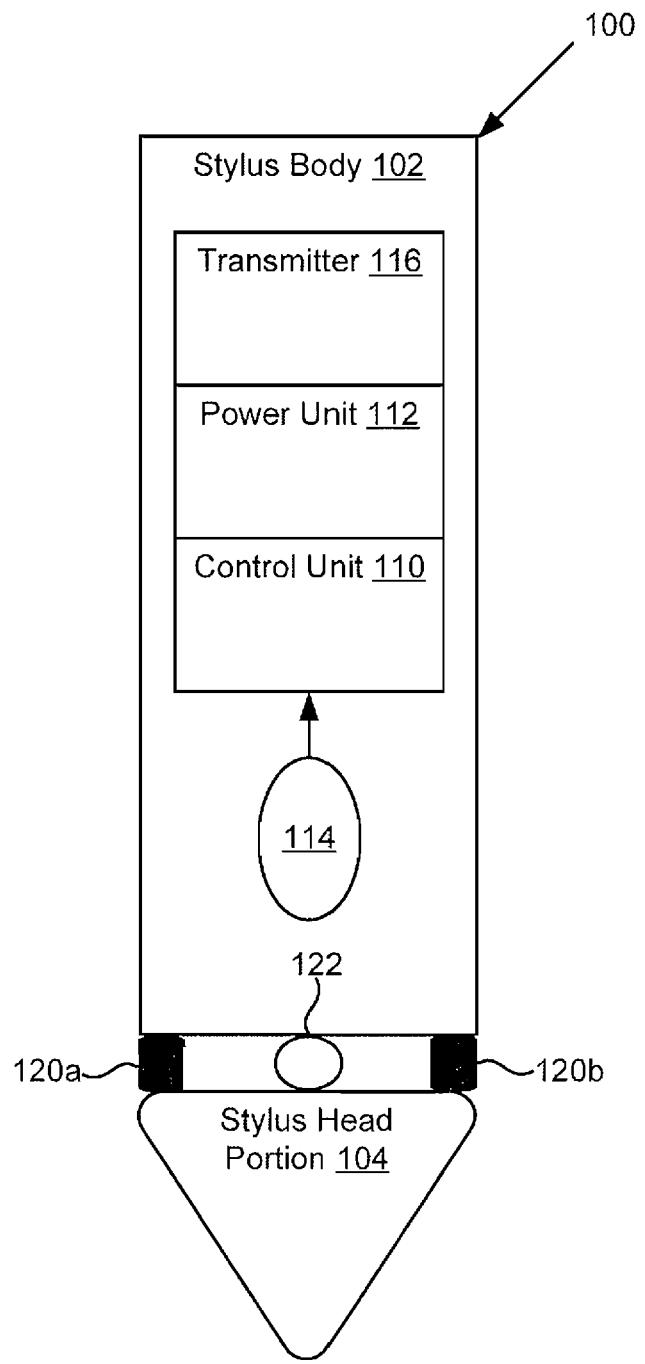
FIG. 1 presents an exemplary diagram of a pressure and angle sensitive stylus device.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a pressure and angle sensitive stylus device. According to FIG. 1, stylus device 100 includes stylus body 102 with control unit 110, power unit 112, input button 114, and transmitter 116. Further shown in FIG. 1 is stylus head portion 104 attached to stylus body 102 with and/or using sensor 120a, sensor 120b, and pivot 122. Stylus head portion 104 may correspond to a section that directly contacts a touch sensitive surface, or indirectly contacts the touch sensitive surface, such as through a further medium. While stylus head portion 104 is shown connected to stylus body 102 through sensors 120a/120b and pivot 122, in other implementations stylus head portion 104 may be attached more directly to stylus body 102, such as incorporated within stylus body 102. Thus, sensors 120a/120b and pivot 122 may be between stylus head portion 104 and stylus body 104 but not used for attachment purposes between stylus head portion 104 and stylus body 102.

As shown in FIG. 1, stylus device 100 contains active features with stylus body 102 having control unit 110, power unit 112, input button 114, and transmitter 116. Control unit 110 may correspond to a processor and memory unit sufficient to control features of stylus device 100. As will be discussed in more detail later, if stylus device 100 is further configured to sense pressure input to a stylus head portion 104, control unit 110 may include a processor and a memory capable of receiving the pressure inputs, properly interpreting them, and/or transmitting them to an interactive device. The processor may correspond to a hardware processor or microprocessor. However, in other implementations the processor refers to a general processor capable of performing the functions required of control unit 110. Further, the memory is a sufficient non-transitory storage medium capable of storing commands, processes, and programs for execution by the processor. The memory may correspond to application and/or data memory. In other implementations, the memory may correspond to a plurality memory types or modules.

As further shown in FIG. 1, stylus device 100 further includes power unit 112. Power unit 112 provides sufficient power to control unit 110 and any features of stylus device 100 requiring power. Power unit 112 may be implemented as a non-rechargeable power source or a rechargeable power source. In the implementation that power unit 112 may be a rechargeable power source, power unit 112 may be recharged by using an electrical outlet, interactive device connection, or through an inductive charger. The inductive charger may correspond to a kinetically chargeable unit, such as an inductor and magnet setup internal to stylus device 100, or an inductor with part or all of inductive charger external to stylus device 100. Power unit 112 may also correspond to a direct power connection to an outside electrical source, such as an electrical outlet or interactive device connection. In another implementation, power unit 112 may correspond to a power unit capable of being kinetically charged. For example, power unit 112 may include a magnet, inductor, and energy storage unit. In such an implementation, the magnet may move in relation of the inductor and induce a current used to charge the energy storage unit. The energy storage unit may be a capacitor or a rechargeable power source. In another implementation, power unit 112 may correspond to more than one of the above examples or other power supply.

Stylus device 100 of FIG. 1 further includes input button 114. Input button 114 may correspond to a power button, feature select button, or other necessary input configurations to allow users to access features of stylus device 100. For example, stylus device 100 may be an active stylus with pressure sensors as will be discussed in greater detail later. Thus, input button 114 may correspond to a power button capable of turning the pressure sensors on/off in order to conserve power. In another implementation, stylus device 100 may include further interactive features capable of being using with an interactive device. Thus, input button 114 may allow for the feature selection in the application. In certain implementations input button 114 may correspond to one input button, however, in other implementations input button 114 may correspond to a plurality of input buttons. Furthermore, in other implementations, input button 114 is optional and/or absent from stylus device 100.

According to FIG. 1, stylus device 100 further includes transmitter 116. Control unit 110 may utilize transmitter 116 to transmit information, such as digital and/or analog data signals, to an interactive device. For example, after receiving input from input button 114, control unit 110 may access transmitter 116 to transmit the input, such as a feature selection, to the interactive device for use in an application. As will be discussed in more detail below, control unit may also receive inputs from sensors 120a/120b. After receiving the inputs, control unit 110 may utilize transmitter 116 to transmit the inputs, or information relating to the inputs, to the interactive device. Additionally, transmitter 116 may include a receiver for receiving information from another transmitter, such as a transmitter of the interactive device. Transmitter 116 may transmit and optionally receive information using radio, audio, infrared, or other communication means.

FIG. 1 is further shown with stylus head portion 104. Stylus head portion 104 of FIG. 1 is shown connected to stylus body 102 through sensor 120a, sensor 120b, and pivot 122. However, as previously discussed, different implementations may more directly connect stylus head portion 104 to stylus body 102. For example, stylus head portion 104 may be directly connected to stylus body 102 with sensors 120a/120b and pivot 122 embedded between stylus body 102 and stylus head portion 104. In another implementation, stylus head portion 104 may be connected using another intermediary between stylus body 102 and stylus head portion 104, where sensors 120a/120b and pivot 122 are in contact with stylus body 102 and stylus head portion 104.

Stylus head portion 104 may correspond to a head portion or nub made of a material to allow touch inputs to a touch sensitive screen of an interactive device. Conventionally, capacitive touch screens respond to a conductive material head portion attached to a pen type body. However, in other implementations, stylus head portion 104 may correspond to any material capable of providing touch inputs to a touch screen. For example, other materials may be used for resistive touch screens. Furthermore, stylus head portion 104 may come in a variety of shapes and configurations, and stylus body 102 may also be designed to mimic a variety of artistic tools, such as a paintbrush, marker, piece of graphite, or other tool.

Stylus head portion 104 may be configured to have a range of movement or compression when attached to stylus body 102. Thus, stylus head portion 104 may angle or compress an amount when pressure is applied between stylus body 102 and stylus head portion 104. For example, if pressure is applied directly perpendicular to the height of stylus head portion 104 when stylus head portion 104 is a triangle with equal side lengths, then stylus head portion 104 may compress directly in towards stylus body 104. In other implementations, a force may be applied at a different angle, and stylus head portion 104 may be configured to move or compress in accordance with the angle of pressure. Further, stylus head portion 104 may be configured in a design that does not create a triangle with equal side lengths, such as a paintbrush or slanted marker. In such an implementation, pressure parallel to a base of stylus body 102 may still cause stylus head portion 104 to compress and angle toward stylus body 102.

As previously discussed, sensor 120a and sensor 120b of FIG. 1 are in contact with stylus body 102 and stylus head portion 104. Sensors 120a/120b may be used as attachment mechanisms between stylus body 102 and stylus head portion 104. Thus, sensors 120a/120b may allow for compression and/or movement of stylus head portion 104. However, in another implementation, sensors 120a/120b may be inserted between stylus body 102 and stylus head portion 104. Sensors 120a/120b may correspond to pressure sensors capable of sensing pressure/force applied to stylus head portion 104. For example, if a user of stylus device 100 presses down against a surface with greater force while holding stylus body 102, sensors 120a/120b may sense the pressure applied between stylus body 102 and stylus head portion 104. In other implementations, sensors 120a/120b may be another sensor type, such as a distance, compression, or velocity sensor, capable of detecting an amount of pressure between stylus body 102 and stylus head portion 104. While sensor 120a and sensor 120b are shown in FIG. 1, more or less sensors may be used as necessary in other implementations. Thus, sensors 120a/120b may correspond to one sensor or a plurality of sensors. Sensors 120a/120b may come in a preloaded state, thus reporting a particular value, in certain embodiments. However, in other embodiments, sensors 120a/120b may not come in a preloaded state, and a threshold force applied to sensors 120a/120b may be required.

Pivot 122 of FIG. 1 is shown between stylus body 102 and stylus head portion 104. Pivot 122 may act as a connection mechanism between stylus body 102 and stylus head portion 104. However, as discussed above, stylus head portion 104 may be otherwise connected to stylus body 102. Thus, pivot 122 may be arranged between stylus body 102 and stylus head portion 104. Pivot 122 may allow for movement and angling of stylus head portion 104 in relation to stylus body 102 when pressure is applied to stylus head portion 104. Furthermore, pivot 122 may be compressible to allow for compression of stylus head portion 104 into stylus body 102.

Moving to FIG. 2A, FIG. 2A shows a more detailed pressure and angle sensitive stylus device with three sensors. FIG. 2 presents stylus device 200 having stylus body 202 with longitudinal body axis 202a and stylus head portion 204. Arranged around longitudinal body axis 202a of stylus body 202 is sensor 220a, sensor 220b and sensor 220c. Further, pivot 222 is attached to stylus body 202 and placed on longitudinal body axis 202a of stylus body 202. Although sensors 220a/220b/220c and pivot 222 are shown attached to stylus body 202, in other implementations, sensors 220a/220b/220c and pivot 222 may be attached to stylus head portion 204 or configured between stylus body 202 and stylus head portion 204 but not permanently attached to either stylus body 202 or stylus head portion 204.

According to FIG. 2A, stylus body 202 is detached from stylus head portion 204. However, as shown in FIG. 2, in other implementations stylus head portion 204 may be attachable to stylus body 202 as designated by the arrows. For example, stylus head portion 204 may be attached or attachable through sensors 220a/220b/220c and/or pivot 222. Stylus head portion 204 may also be directly attached to stylus body 202 or more indirectly attached. Thus, the detached or detachable stylus head portion 204 shown in FIG. 2A may come in different configurations depending on the desired implementation. If stylus head portion 204 is detachable from stylus body 202, stylus device 200 may recalibrate sensors 220a/220b/220c so that they are properly calibrated when stylus head portion 204 is reattached to stylus body 202. Additionally, stylus device 200 may transmit information relating to stylus head portion 204 attached to stylus body 202, such as the type of stylus head portion 204 and/or the configuration of stylus head portion 204.

Stylus body 202 is shown with sensors 220a/220b/220c arranged on one end of stylus body 202. As discussed above, sensors 220a/220b/220c may correspond to pressure sensors or another sensor capable of determining a pressure and/or angle of pressure applied to stylus head portion 204 of stylus device 200. Sensors 220a/220b/220c may be arranged in patterns on stylus body 202. For example, as shown in FIG. 2, sensors 220a/220b/220c are arranged in a coaxial radial pattern around longitudinal stylus axis 202a. However, in other implementations, sensors 220a/220b/220c may be arranged in another pattern, and more or fewer sensors may be used in varying patterns based on the desired input and artistic design of stylus 200.

Along longitudinal stylus axis 202a is pivot 222 in FIG. 2. As discussed above, pivot 222 may be solid or compressible and act as a pivot for stylus head portion 204 to pivot about as pressure is applied to stylus head portion 204. Pivot 222 may also be located elsewhere from longitudinal stylus axis 202a. Pivot may be located closer to sensor 220a/220b/220c in the case where stylus head portion 204 may correspond to a different type of stylus head portion, such as a slanted marker or paintbrush. In such an implementation, pivot 222 may be located elsewhere to get a desired pressure distribution to sensors 220a/220b/220c. Pivot 222 may allow sensors 220a/220b/220c to expand and/or compress along their axis of measurement.

Although sensors 220a/220b/220c and pivot 222 are shown in stylus body 202, in other implementations, sensors 220a/220b/220c and pivot 222 may be located in stylus head portion 204. Additionally, in the implementation where stylus head portion 204 is detachable from stylus body 202, sensors 220a/220b/220c and pivot 222 may be arranged in varying patterns and in varying configurations in order to identify and/or mimic the desired artistic tool. Thus, stylus head portion 204 may come in a variety of configurations with differing locations and amounts of sensors 220a/220b/220c and pivot 222 as necessary. Stylus device 200 may be configured to detect the varying head portion shapes and/or sensor/pivot placements in order to properly adjust input received from sensors 220a/220b/220c. Additionally, stylus device 200 may transmit information relating to stylus head portion 204 attached to stylus body 202 as well as a placement of sensors 220a/220b/220c and pivot 222 and the sensitivity of sensors 220a/220b/220c.

As shown in FIG. 2A, stylus head portion 204 may be detachable from stylus body 202. Thus, sensors 220a/220b/220c may be exposed, partially exposed, or covered in a manner to receive inputs. In such an implementation, sensors 220a/220b/220c may be configured to receive pressure inputs from a user of stylus device 200. By utilizing touch inputs, the user can operate stylus device in another manner. This manner may be similar to a mouse track pad or nub associated with laptop computers. For example, a user may remove stylus head portion 204 from stylus body 202 and use their thumb or index finger to move or roll over sensors 220a/220b/220c. In response, stylus device 200 may receive and interpret the inputs in a similar manner to a mouse or trackpad and transmit the inputs to an interactive device. Additionally, instead of leaving sensors 220a/220b/220c exposed or partially exposed as discussed above, stylus head portion 204 may be designed in a manner to be attached to stylus device and receive pressure inputs. Thus, stylus head portion 204 may constitute a rubber nub, cap, joystick, or finger pad that operates to accept pressure inputs from the user.

Stylus device 200 with stylus head portion 204 may also be utilized as a joystick type device. Stylus device 200 may be configured to be attachable to a base, so that stylus head portion 204 is placed into the base. In another implementation, stylus head portion 204 may be removable and stylus body 202 may be inserted into the base. Sensors 220a/220b/220c may then receive inputs from manipulating stylus device 200 or stylus body 202 as a joystick, such as by tilting or angling stylus device 200 or stylus body 202 while inserted into the base. This operation may mimic a joystick type device, such as a video game joystick input device. The base may be attachable to a surface for stability, such through the use of one or more suction cups, or may be of sufficient size to prevent movement of stylus device 200 or stylus body 202 during use.

By utilizing stylus device 200 as a trackpad/mouse and/or a joystick, stylus device 200 may be utilized with games on an interactive device. Stylus device 200 may be configured to detect when a user wishes to utilize stylus device 200 with a game, and transmit that information to an interactive device. Stylus device 200 may do so by detecting stylus head portion 204 attached to stylus body 202, pressure inputs directly to sensors 220a/220b/220c of stylus body 202, or a base used with stylus device 200. Additionally, if a base is used with stylus device 200, the base may transmit information relating to the inputs and/or the desired function, such as running a game, to the interactive device.

Moving to FIG. 2B, FIG. 2B shows a cross section of a body of a pressure and angle sensitive stylus device with three sensors arranged in a radially symmetric pattern about a longitudinal axis of the stylus device. As shown in FIG. 2B, stylus body 202 includes sensor 220a, sensor 220b, and sensor 220c arranged around pivot 222. FIG. 2B shows a direct view of the top surface of a cylinder from stylus body 202. Thus, stylus body 202, sensors 220a/220b/220c, and pivot 222 of FIG. 2B corresponds to stylus body 202, sensors 220a/220b/220c, and pivot 222 of FIG. 2A, respectively.

According to FIG. 2B, stylus body 202 has sensors 220a/220b/220c arranged in a radially symmetric pattern about a longitudinal axis of stylus body 202. Thus, each sensor 220a/220b/220c is arranged equidistant from pivot 222 and each other In FIG. 2B, with the angle between each sensor on the top of the cylinder at 120 degrees. Arranging sensors 220a/220b/220c in this pattern allows for input to each sensor 220a/220b/220c during use of the stylus device. However, depending on the number and arrangement of sensors 220a/220b/220c, alternative spacing arrangement may be implemented. A stylus head portion of the stylus device may compress, expand, or receive pressure input at an angle allowing for sensors 220a/220b/220c to detect both a pressure input to the stylus device and an angle of pressure/use of the stylus device. These inputs detected by sensors 220a/220b/220c may then allow the stylus device, the interactive device, or a combination of the stylus device and the interactive device, to detect if a user's intention is to hold the stylus device like a pen, shade to the side with a pencil, brush with a paintbrush, or other usage similar to varying artistic tools.

Although sensors 220a/220b/220c and pivot 222 are shown in stylus body 202 of FIG. 2B, as discussed above, sensors 220a/220b/220c and pivot 222 may be located in a stylus head portion, such as stylus top 204 of FIG. 2A. In such an implementation, sensors 220a/220b/220c may be located about a longitudinal axis of one or more parts of a stylus device. Additionally, pivot 222 may be located along or about a longitudinal axis of one or more parts of a stylus device. However, sensors 220a/220b/220c and pivot 222 may be arranged differently in order to achieve the desired implementation. Sensors 220a/220b/220c may be configured with varying degrees of sensitivity, movement range, or compression depending on the implementation and the type of artistic tool to be mimicked. Additionally, pivot 222 may also be configured with varying amount of compression in a similar manner.

Sensors 220a/220b/220c may be located, attached, and/or incorporated on a circuit structure. In one implementation, all of sensors 220a/220b/220c are incorporated on the same circuit structure. This allows for ease and cost efficiency during construction. Additionally, utilizing a single circuit structure may allow for changing and/or repair of sensors 220a/220b/220c and/or the circuit structure more efficiently or cost effectively depending on the desired artistic effect or usage.

Referring now to FIG. 2C, FIG. 2C presents a pressure and angle sensitive stylus device in use with a touch sensitive surface. As shown in FIG. 2C, stylus device 200 includes sensor 220a and sensor 220b. According to FIG. 2C, stylus device 200 is being used with touch sensitive surface 230 resulting in input 224a and 224b to sensor 220a and 220b respectively. FIG. 2C shows a side view of stylus device 200 in use with touch sensitive surface 230. Thus, sensors 220a/220b correspond to sensors 220a/220b of FIG. 2A and FIG. 2B.

According to FIG. 2C, stylus device 200 is used with touch sensitive surface 230. Touch sensitive surface 230 may correspond to a capacitive or resistive touch-sensitive surface of an interactive device. More generally, touch sensitive surface 230 corresponds to any surface capable of detecting touch inputs. In other implementations, touch sensitive surface 230 may be used with other devices and may correspond to a variety of surface configurations.

When stylus device 200 is used with touch sensitive surface 230, sensors 220a/220b receive inputs 224a/224b. As previously discussed, a pivot and/or moveable stylus head portion configuration may be used to that sensors 220a/220b receive inputs 224a/224b based on pressure applied to the stylus head portion. Thus, the stylus head portion, pivot, and/or sensors 220a/220b may be compressible. As shown in FIG. 2C, parts of stylus device 200 may move in relation to each other based on the applied pressure. Thus, as can be seen in FIG. 2C, sensor 220a is compressed, while sensor 220b is either extended or not receiving any compression and/or input.

Stylus device 200 of FIG. 2C may receive inputs 224a/224b based on the pressure applied to stylus device 200 from utilizing stylus device 200 with touch sensitive surface 230. Inputs 224a/224b may correspond to pressure inputs, thus stylus device 200, an interactive device corresponding to touch sensitive surface 230, or a combination of stylus device 200 and the interactive device, may be able to sense the amount of pressure applied when utilizing stylus device 200 with touch sensitive surface 230. Additionally, by utilizing multiple sensors 220a/220b, stylus device may also be able to detect an angle of pressure of applied to stylus device 200. Thus, stylus device 200 may utilize the compression and movement of a stylus head portion, pivot, and/or sensors 220a/220b in order to determine the angle of pressure stylus device 200 is applying to touch sensitive surface 230. In doing so, stylus device 200 can determine the angle of use of stylus device 230 from inputs 224a/224b.

In addition to detecting the angle of pressure and/or use of stylus device 200, inputs 224a/224b received from sensors 220a/220b may also be used to determine the angle a user is holding stylus device 200, an interactive device, or a combination of stylus device 200 and the interactive device. This may be important to determine if a user is attempting to use stylus device 200 in a specific artistic manner with touch sensitive surface 230. For example, a user may attempt to shade using the side of a stylus head portion of stylus device 230, or may be using stylus device 230 as a paintbrush. By detecting the angle of pressure and therefore use of stylus device 200, and how it changes, inputs 224a/224b can be used to properly select the appropriate artistic style. Additionally, based on inputs 224a/224b and variations in inputs 224a/224b, a velocity of use of stylus device 200 may be determined. This may be useful in the case of quick brushstrokes or thick highlighting. Additionally, sensors 220a/220b may be utilized to determine a velocity of use of stylus device 200 based on inputs 224a/224b or additional inputs.

FIGS. 1, 2A, 2B, and 2C will now be further described by reference to FIG. 3, which presents flowchart 300 showing an exemplary method for use by a kinetically chargeable stylus device. With respect to the method outlined in FIG. 3, it is noted that certain details and features have been left out of flowchart 300 in order not to obscure the discussion of the inventive features in the present application.

Figure 3:
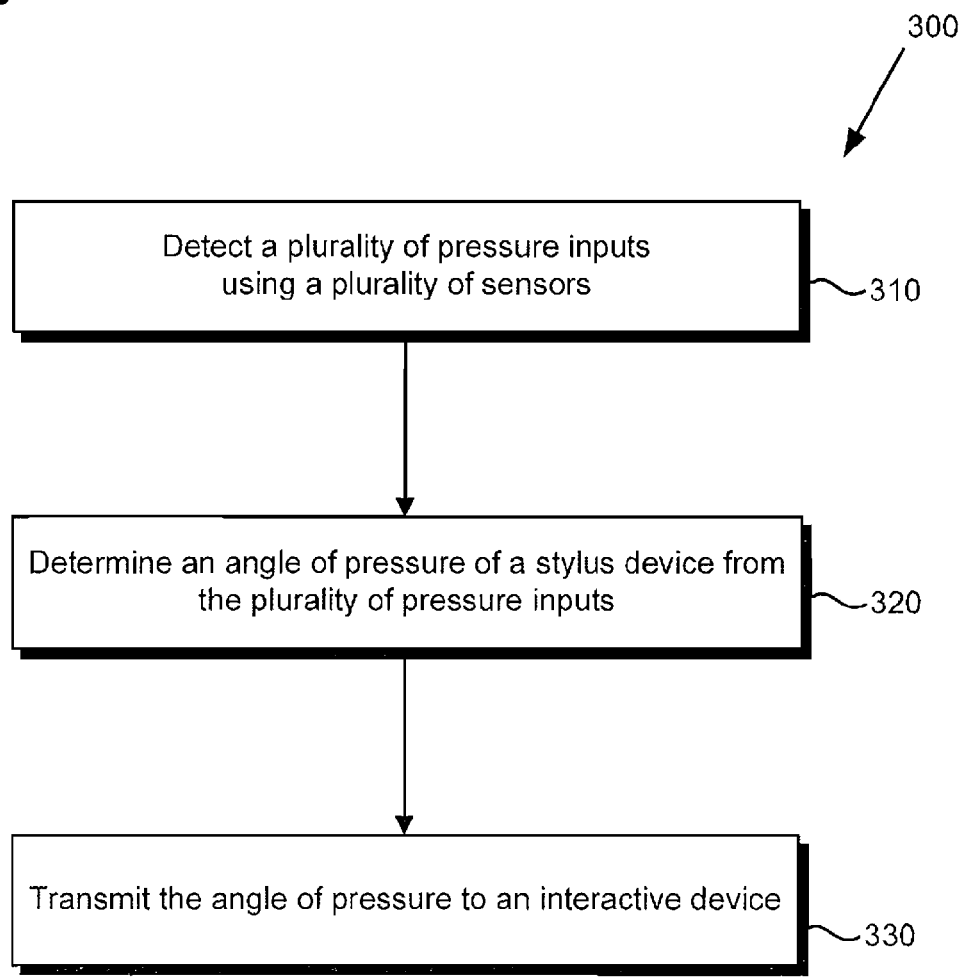
FIG. 3 presents an exemplary flowchart illustrating a method for use by a pressure and angle sensitive stylus device.

Referring to FIG. 3 in combination with FIG. 1, FIG. 2A, FIG. 2B, and FIG. 2C, flowchart 300 begins with detecting at least one pressure input 224a/224b using at least one sensor 120a/120b/220a/220b/220c (310). The detecting may be performed by control unit 110 after receiving input 224a/224b from sensors 120a/120b/220a/220b/220c. As previously discussed, sensors 120a/120b/220a/220b/220c may be configured to detect pressure inputs, corresponding to inputs 224a/224b, based on the use of stylus device 100/200. The use of stylus device 100/200 may correspond to the angle of pressure applied to stylus head portion 104/204 or the velocity of use of stylus device 100/200.

Additionally, the pressure inputs may correspond to pressure inputs applied to sensors 120a/120b/220a/220b/220c when stylus head portion 104/204 is removed and/or replaced with a mouse style nub or attachment, or stylus device 100/200 is placed in a base. As previously discussed, such a configuration may be used to convert sylus device 100/200 into a mouse or joystick type device. Thus, stylus device 100/200 may detected movement and pressure inputs applied to sensors 120a/120b/220a/220b/220c, such as inputs 224/224b, and cause the proper response in an application of an interactive device.

If no pressure is applied to stylus device 100/200, control unit 110 may recalibrate sensors 120a/120b/220a/220b/220c. Thus, when a user is not using stylus device 100/200, sensors 120a/120b/220a/220b/220c may be recalibrated so they are ready for future use. Additionally, recalibration may occur when stylus head portion 104/204 is removed from stylus body 102/202. Sensors 120a/120b/220a/220b/220c may return to their original state when stylus head portion 104/204 is removed to allow for touch inputs by a user or a different stylus head portion. Adding a new stylus head portion or placing stylus device 100/200 in a base may cause different calibrations of sensors 120a/120b/220a/220b/220c in order to compensate for the change in style and/or form.

Proceeding with FIG. 3, flowchart 300 continues by determining an angle of pressure of a stylus device 100/200 from the at least one pressure input 224a/224b (320). Control unit 110 may perform the determining the angle of pressure using inputs 224a/224b received from sensors 120a/120b/220a/220b/220c. The angle of pressure may be determined based on the varying amount of pressure, expansion, or compression applied to sensors 120a/120b/220a/220b/220c. For example, when a user hold stylus device 100/200 at a 45 degree angle, sensor 220a of FIG. 2C may receive more compression, while sensor 220b of FIG. 2C receives less compression, no compression, or is extended. Based on inputs 224a/224b, control unit 110 may determine stylus head portion is applying pressure at a 45 degree angle relative to touch sensitive surface 230. Thus, using the angle of pressure, an angle of use and thus a desired artistic style using stylus device 100/200 may be determined.

Method 300 of FIG. 3 continues by transmitting the angle of pressure to an interactive device (330). The transmitting may be done by control unit 110 utilizing transmitter 116 to transmit the angle of pressure to an interactive device. Control unit 110 may transmit inputs 224a/224b to an interactive device. The interactive device may then determine a corresponding action to take based in inputs 224a/224b.

Control unit 110 may also transmit further information with or without the angle of pressure to the interactive device. For example, control unit 110 may determine an artistic style for use with stylus device 100/200 and the interactive device based on a certain angle, pressure, and/or velocity. Thus, using inputs 224a/224b, control unit 110 may transmit that information to a stylus device using transmitter 116.

In this manner, a pressure and angle sensitive stylus device may allow a user additional functionality while using an active style with a touch sensitive surface. Previous inputs that were not possible using a touch screen may be autilized in order to provide better use and precision using an active styli. Additionally, a user may further benefit from an active styli configured as described above by utilizing the styli in a number of manners, such as a pointing device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A stylus device for use with an interactive device including a surface that detects input by the stylus device, the stylus device comprising:
a stylus body;
a plurality of stylus head portions each having a type, each of the plurality of stylus head portions being attachable to and removable from the stylus body;
a plurality of sensors;
a compressible pivot located on a longitudinal axis of the stylus device, wherein the compressible pivot allows for movement and angling of a stylus head portion of the plurality of stylus head portions in relation to the stylus body, and wherein the plurality of sensors are arranged around the compressible pivot; and
a control unit, the control unit configured to:
detect the type of the stylus head portion of the plurality of stylus head portions attached to the stylus body through the plurality of sensors and the compressible pivot, wherein a proximity of the compressible pivot to one or more of the plurality of sensors varies based on the type of the stylus head portion of the plurality of stylus head portions;
transmit the detected type of the stylus head portion to the interactive device;
sense a pressure applied to the stylus head portion using the plurality of sensors; and
transmit information relating to the pressure to the interactive device.

2. The stylus device of claim 1, wherein the plurality of sensors include three pressure sensors arranged in a radially symmetric pattern about the longitudinal axis of the stylus device.

3. The stylus device of claim 1, wherein the control unit is further configured to determine an angle of the pressure applied to the stylus head portion, and wherein the information includes the angle of the pressure applied to the stylus head portion.

4. The stylus device of claim 1, wherein in response to attachment of the stylus head portion to the stylus body, the control unit is further configured to calibrate the plurality of sensors.

5. The stylus device of claim 1, wherein the plurality of sensors are in each of the plurality of stylus head portions, and wherein placements of the compressible pivot and the plurality of sensors within each of the plurality of stylus head portions vary based on the type of each of the plurality of stylus head portions, and wherein the control unit is further configured to detect and transmit the placements of the compressible pivot and the plurality of sensors within each of the plurality of stylus head portions to the interactive device.

6. The stylus device of claim 1, wherein the control unit is further configured to transmit sensitivities of the plurality of sensors to the interactive device.

7. The stylus device of claim 1, wherein the control unit is further configured to:
determine a velocity of usage of the stylus device from the plurality of sensors.

8. A method for use by a stylus device in communication with an interactive device including a surface that detects input by the stylus device, the stylus device including a stylus body, a plurality of stylus head portions each having a type, each of the plurality of stylus head portions being attachable to and removable from the stylus body, a plurality of sensors, a compressible pivot located on a longitudinal axis of the stylus device, and a control unit, the method comprising:
detecting, using the control unit, the type of a stylus head portion of the plurality of stylus head portions attached to the stylus body through the plurality of sensors and the compressible pivot, wherein the plurality of sensors are arranged around the compressible pivot located on the longitudinal axis of the stylus device, wherein the compressible pivot allows for movement and angling of the stylus head portion in relation to stylus body, and wherein a proximity of the compressible pivot to one or more of the plurality of sensors varies based on the type of the stylus head portion of the plurality of stylus head portions;
transmitting, using the control unit, the detected type of the stylus head portion to the interactive device;
sensing, using the control unit, a pressure applied to the stylus head portion using the plurality of sensors; and
transmitting, using the control unit, information relating to the pressure to the interactive device.

9. The method of claim 8 further comprising:
   determining, using the control unit, an angle of the pressure applied to the stylus head portion, and wherein the information includes the angle of the pressure applied to the stylus head portion.

10. The method of claim 8 further comprising calibrating the plurality of sensors in response to attachment of the stylus head portion to the stylus body.

11. The method of claim 8, wherein the calibrating the plurality of sensors is based on the detected type of the stylus head portion.

12. The method of claim 8, wherein the plurality of sensors are in each of the plurality of stylus head portions, and wherein placements of the compressible pivot and the plurality of sensors within each of the plurality of stylus head portions vary based on the type of each of the plurality of stylus head portions, and wherein the method further comprises detecting and transmitting the placements of the compressible pivot and the plurality of sensors within each of the plurality of stylus head portions to the interactive device.

13. The method of claim 8 further comprising transmitting sensitivities of the plurality of sensors to the interactive device.

14. The method of claim 8 further comprising:
   determining a velocity of usage of the stylus device using the plurality of sensors; and
   transmitting the velocity of usage of the stylus device to the interactive device.

\* \* \* \* \*